(12) United States Patent
Marco et al.

(10) Patent No.: US 8,837,519 B2
(45) Date of Patent: Sep. 16, 2014

(54) METHOD AND DEVICE FOR PREEMPTIVELY TRANSMITTING A SIGNAL IN ACCORDANCE WITH A MCS OTHER THAN A NETWORK COMMANDED MCS

(75) Inventors: Olivier Marco, Toulouse (FR);
Matthieu Baglin, Toulouse (FR)

(73) Assignee: Motorola Mobility LLC, Libertyville, IL (US)

( * ) Notice: Subject to any disclaimer, the term of this patent is extended or adjusted under 35 U.S.C. 154(b) by 466 days.

(21) Appl. No.: 12/369,202

(22) Filed: Feb. 11, 2009

(65) Prior Publication Data

US 2009/0275324 A1     Nov. 5, 2009

(30) Foreign Application Priority Data

Apr. 30, 2008   (EP) .................................. EP08305140

(51) Int. Cl.
 *H04J 3/16*       (2006.01)
 *H04J 3/22*       (2006.01)
 *H04L 1/00*       (2006.01)
(52) U.S. Cl.
 CPC ............. *H04L 1/0032* (2013.01); *H04L 1/0009* (2013.01); *H04L 1/0003* (2013.01); *H04L 1/0026* (2013.01); *H04L 1/0025* (2013.01)
 USPC ........... 370/465; 370/204; 370/252; 370/310; 370/328; 370/329; 370/335; 370/342; 370/349; 375/227; 455/67.11; 455/67.13; 455/69; 455/102; 455/422.1; 455/450; 455/452.1; 455/509; 714/708; 714/748; 714/749; 714/750; 714/751; 714/757; 714/758
(58) Field of Classification Search
 CPC ... H04L 1/0003; H04L 1/0075; H04L 1/0009; H04L 1/0026; H04L 1/0015; H04L 1/0025; H04L 1/0002; H04L 1/0004; H04L 1/0006; H04L 1/0014; H04W 28/04; H04W 24/18; H04W 24/02; H04W 28/048

USPC ................ 455/422.1, 450, 452.1, 509, 67.11, 455/67.13, 69, 102; 375/298, 227; 370/204, 370/252, 310, 328, 329, 335, 342, 349, 370/465; 714/708, 748, 749, 750, 751, 757, 714/758
 See application file for complete search history.

(56) References Cited

U.S. PATENT DOCUMENTS 5,490,168 A  *  2/1996  Phillips et al. ................ 375/224
6,208,663 B1 *  3/2001  Schramm et al. ............. 370/465
 (Continued)

FOREIGN PATENT DOCUMENTS

EP            1255368 A1   11/2002
WO         2008073103 A1    6/2008

OTHER PUBLICATIONS

John Simpson & Edmund Weiner, Oxford English Dictionary, Publish date of year 1989, month december, Oxford English Dictionary, see pp. 1, 4 and 7 (p. 7 shows publish date).*

(Continued)

*Primary Examiner* — Olumide T Ajibade Akonai
(74) *Attorney, Agent, or Firm* — Faegre Baker Daniels LLP

(57) ABSTRACT

Disclosed are mobile communication devices and methods of a mobile communication device that determines that no response has been received within a predetermined period of time from a network to a transmission of an encoded data block in accordance with a commanded MCS. The device then determines an alternative MCS capable of coping better with variations in the radio environment with minimal damage or alteration than the commanded MCS and preemptively transmits the encoded data block in accordance with this more robust alternative MCS. In this way the mobile communication device does not continue failed attempts to transmit data in accordance with the commanded MCS. After the device receives notice of successful transmission of the encoded data block with the alternative MCS, the device will resume the use of the commanded MCS to transmit subsequent encoded data blocks.

11 Claims, 3 Drawing Sheets

(56) References Cited

U.S. PATENT DOCUMENTS

| | | | |
|---|---|---|---|
| 6,567,375 B2* | 5/2003 | Balachandran et al. | 370/204 |
| 6,643,322 B1* | 11/2003 | Varma et al. | 375/227 |
| 6,865,233 B1* | 3/2005 | Eriksson et al. | 375/261 |
| 7,027,420 B2* | 4/2006 | Hamalainen | 370/335 |
| 7,149,245 B2 | 12/2006 | Budka et al. | |
| 7,584,397 B2* | 9/2009 | Terry | 714/748 |
| 7,593,697 B2* | 9/2009 | Zhu et al. | 455/102 |
| 8,074,140 B2* | 12/2011 | Terry et al. | 714/748 |
| 2002/0071407 A1* | 6/2002 | Koo et al. | 370/335 |
| 2003/0152062 A1* | 8/2003 | Terry et al. | 370/349 |
| 2003/0214928 A1* | 11/2003 | Chuah | 370/336 |
| 2004/0242231 A1 | 12/2004 | Tang et al. | |
| 2005/0025254 A1* | 2/2005 | Awad et al. | 375/295 |
| 2005/0138530 A1* | 6/2005 | Huang et al. | 714/774 |
| 2005/0265298 A1* | 12/2005 | Adachi et al. | 370/338 |
| 2005/0276266 A1 | 12/2005 | Terry | |
| 2008/0214119 A1* | 9/2008 | Calvanese Strinati | 455/67.13 |

OTHER PUBLICATIONS

"3GPP TR 25.814 V7.1.0; 3rd Generation Partnership Project; Technical Specification Group Radio Access Network; Physical Layer Aspects for Evolved UTRA (Release 7)" 19000101, Jan. 1, 1900, XP002437719; p. 74.

ETSI TS 144 060 v6.20.0 (Dec. 2006), Digital cellular telecommunications system (Phase 2+); General Packet Radio Service (GPRS); Mobile Station (MS)—Base Station System (BSS) interface; Radio Link Control/Medium Access Control (RLC/MAC) protocol (3GPP TS 44.060 version 6.20.0 Release 6), all pages.

European Search Report, The Hague, Oct. 13, 2008, EP 08 30 5140, all pages.

Communication pursuant to Article 94(3) EPC, Application No. 08305140.9-1851, Feb. 20, 2013, all pages.

\* cited by examiner

| Channel Coding Scheme | EGPRS RLC data unit size (N2) (octets) | Family |
|---|---|---|
| MCS-1 | 22 | C |
| MCS-2 | 28 | B |
| MCS-3 | 37 | A |
| MCS-4 | 44 | C |
| MCS-5 | 56 | B |
| MCS-6 | 74 | A |
| MCS-7 | 2x56 | B |
| MCS-8 | 2x68 | A |
| MCS-9 | 2x74 | A |

8PSK { MCS-5 through MCS-9

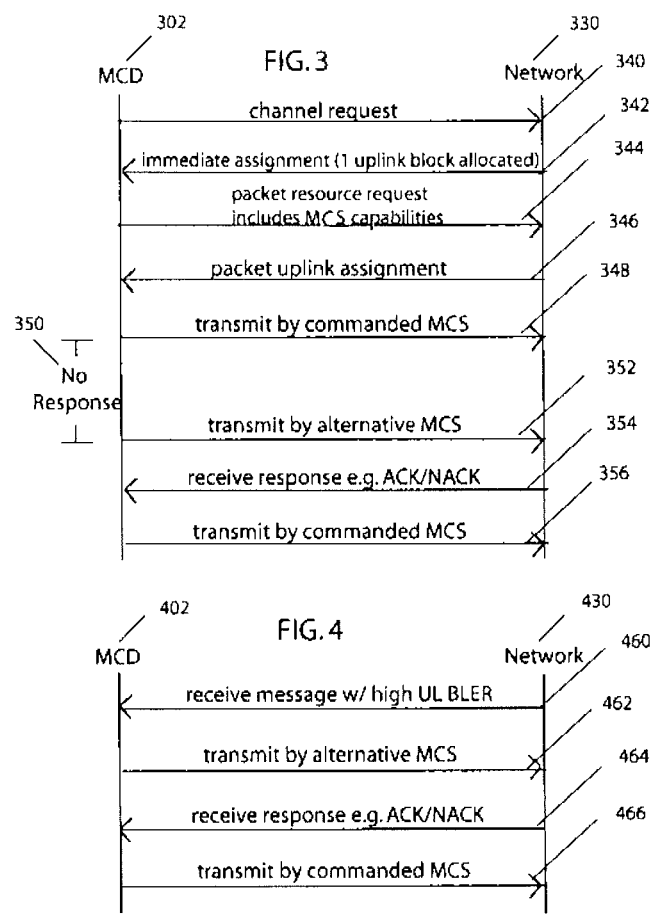

METHOD AND DEVICE FOR PREEMPTIVELY TRANSMITTING A SIGNAL IN ACCORDANCE WITH A MCS OTHER THAN A NETWORK COMMANDED MCS

FIELD OF THE INVENTION

Disclosed are methods and device for preemptively transmitting a signal in accordance with a MCS (Modulation and Coding Scheme) other than a network commanded MCS, and more particularly transmitting a signal in accordance with a more robust MCS than the commanded MCS.

BACKGROUND

The Global System Mobile Communications (GSM) is used by over 80% of the global mobile market, that is, it is used by over 2 billion users in more than 212 countries and territories. GSM is a substantial improvement over its predecessors in that both signaling and speech channels are digital call quality. GSM is considered a Second Generation (2G) mobile communication system. The newer $3^{rd}$ Generation Partnership Project (3GPP) networks and 3GPP-enabled mobile communication devices are capable of transmitting and receiving substantially higher data throughput than 2G. Current 3GPP standards incorporate the latest revision of the GSM standards. On the other hand, the other 20% of the global mobile market utilizes Code Division Multiple Access (CDMA) which specifies standards for another 3G technology, $3^{rd}$ Generation Partnership Project 2 (3GPP2). Both standards continue to evolve.

For data transfer under a GSM air interface, General Packet Radio Service (GPRS) provides a packet oriented (digital) Mobile Data Service. GPRS may be used for data transfers such as Wireless Application Protocol (WAP) access, Short Message Service (SMS) Multimedia Messaging Service (MMS) and for Internet communication services. GSM and GPRS networks both employ Gaussian filtered Minimum Shift Keying (GMSK) as a modulation scheme because of its narrow bandwidth, robustness to fading and phase noise as it has a low modulation level and may employ a high number of redundancy bits, and relatively low implementation complexity. GMSK's modulation carries one bit per channel symbol. For higher data throughput, a data capacity improvement to GPRS is the Enhanced General Packet Radio Service (EGPRS) which squeezes more data carrying capacity out of the GSM air interface than GPRS. In addition to GMSK, EGPRS uses Eight Phase Shift Keying (8-PSK) modulation which has three times the bit-per-symbol density of GMSK. The drawback is that 8-PSK is less robust than GMSK.

Nine different Modulation and Coding Schemes (MCSs), identified as MCS-1 through MCS-9, are defined by the current EGPRS system specifications. EGPRS networks utilize both GMSK and 8-PSK. MCS-1 through MSC-4 are GMSK. MCS-4 through MCS-9 are 8-PSK. As mentioned above, GMSK is more robust than 8-PSK. Moreover, the higher the MCS number, the less reliable the coding scheme. For example, MCS-4 is less robust than MCS-3, and so on.

3GPP has also released a new version of EGPRS called EDGE Evolution. With EDGE Evolution, latencies are reduced and bit rates are increased up to 1 MBit/s. Higher symbol rate and higher-order modulation (32 quadrature amplitude modulation, 32QAM, and 16QAM instead of 8-PSK) are used with new MCS called UAS and UBS (EGPRS2 Uplink level A modulation and coding Schemes and EGPRS2 Uplink level B modulation and coding Schemes). The same remark on robustness applies to UAS and UBS coding schemes.

In 2G networks, when data needs to be transferred from the mobile station (MS) to the network (NW), the MS initiates the establishment of an uplink Temporary Block Flow (TBF). The NW will allocate radio resources to be used by the MS to transfer uplink data. There are several variants of this procedure. A typical scenario is the following (known as "two phases access"). The MS first sends a CHANNEL_REQUEST or PACKET CHANNEL REQUEST for resource allocation. The NW allocates in return limited resources (1 or 2 radio blocks). The allocated radio resources are transmitted to the MS in a PACKET UPLINK ASSIGNMENT or IMMEDIATE ASSIGNMENT message. The MS transmits a PACKET RESOURCE REQUEST message to the network by using the limited allocated radio resources. The network may then assign radio resources for the uplink TBF with a PACKET UPLINK ASSIGNMENT message. In the PACKET UPLINK ASSIGNMENT message, the network indicates the MCS to be used by the MS to transmit data blocks in uplink. This MCS is referred as the "commanded MCS". In another scenario, known as "one phase access", the NW directly assigns the radio resources to the MS when receiving the CHANNEL REQUEST, without the limited resource assignment/PACKET RESOURCE REQUEST sending step.

In the current EGPRS standards, the CHANNEL_REQUEST and PACKET_CHANNEL_REQUEST are encoded using GMSK modulation and a robust coding scheme. Similarly, under standards, the PACKET RESOURCE REQUEST message, in the case of two phase access, is encoded using GMSK modulation and a robust coding scheme. However, as soon as network allocates radio resources for the uplink TBF, the MS uses the MCS commanded in the PACKET UPLINK ASSIGNMENT message to transmit the uplink data. Indeed, an EGPRS network commands the type of Modulation and Coding Scheme (MCS) that the mobile communication device will use to transmit data to the network. In particular, the EGPRS network may command that the mobile communication device transmit data at the highest rate that the network is capable of receiving and processing, e.g. using a less robust 8-PSK MCS.

However, since the initial request messages (CHANNEL_REQUEST, PACKET_CHANNEL_REQUEST, PACKET RESOURCE REQUEST message) are encoded using GMSK modulation and a robust coding scheme, whereas the uplink data using the commanded less robust MCS, it can happen that the network is not able to decode the uplink data even if it has correctly decoded the initial access request messages.

Failure of uplink data transmissions using a less robust MCS may occur for different reasons. In particular, a mobile communication device may be located near the boundary of its serving network cell (typically, the MS may be far from any NW radio stations). Also, a mobile communication device may cross from one network cell range into another network cell range. Additionally, there may be some type of signal disturbance or interference. Therefore, the failure to transmit in accordance with the commanded MCS may be self-rectified when the mobile communication device roams into an optimal range or a signal disturbance ceases. Also, the NW may command an 8PSK MCS and ask for the maximum output power from the MS. Since typically the maximum output power of the MS is lower in 8PSK than in GMSK, this can increase the probability of having the uplink data not decoded by the NW.

The mobile communication device will continue to attempt to transmit data in the commanded MCS until it receives acknowledgement from the network that the data has been received, or a non-acknowledgement message indicating which data blocks have not been received by the NW. In such message, NW could assign a different "commanded MCS" more robust than the initial one, in order to adapt the uplink transmission to the radio conditions (this is known as link adaptation). However, receiving such a message can take some time. This is dependent on the NW implementation. Typically the NW could wait for receiving some data from the MS before sending such a message. In case of bad radio conditions, the NW may hardly notice that the MS has started transmitting with the commanded MCS, and as a result may either delay the sending of a non-acknowledgement message, or may not even send any non-acknowledgement message. Since the MS must use the less robust commanded MCS to transmit uplink data, there may be no way to improve the uplink transmission. Even the sending of a small amount of data (which is typically the case for mobility signaling procedures for instance) can fail. Impacts are multiple. While repeatedly failing to successfully transmit data to the EGPRS network in accordance with the commanded MCS, the current drain of the mobile communication device may be substantial, particularly if finally receiving the data of the transfer takes a substantial amount of time. Moreover, with repeated failed attempts service availability suffers. For example, a user may be unable to receive circuit switched calls during such attempts. Moreover, if the uplink data transfer is linked to a mobility signaling procedure, impact may be worse since the MS will try several times to perform this procedure, and may finally have to change its serving cell. An improvement in the uplink data transmission procedure may be beneficial.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is a signal diagram depicting an embodiment of the disclosed methods where a mobile communication device for example may roam out of optimal range of network station;

FIG. 4 depicts a signal diagram of an embodiment of the disclosed methods involving a network that can transmit an Uplink Block Error Rate (UL BLER) value to a mobile communication device when a transmission from the device fails.

DETAILED DESCRIPTION

Figures 1, 2:
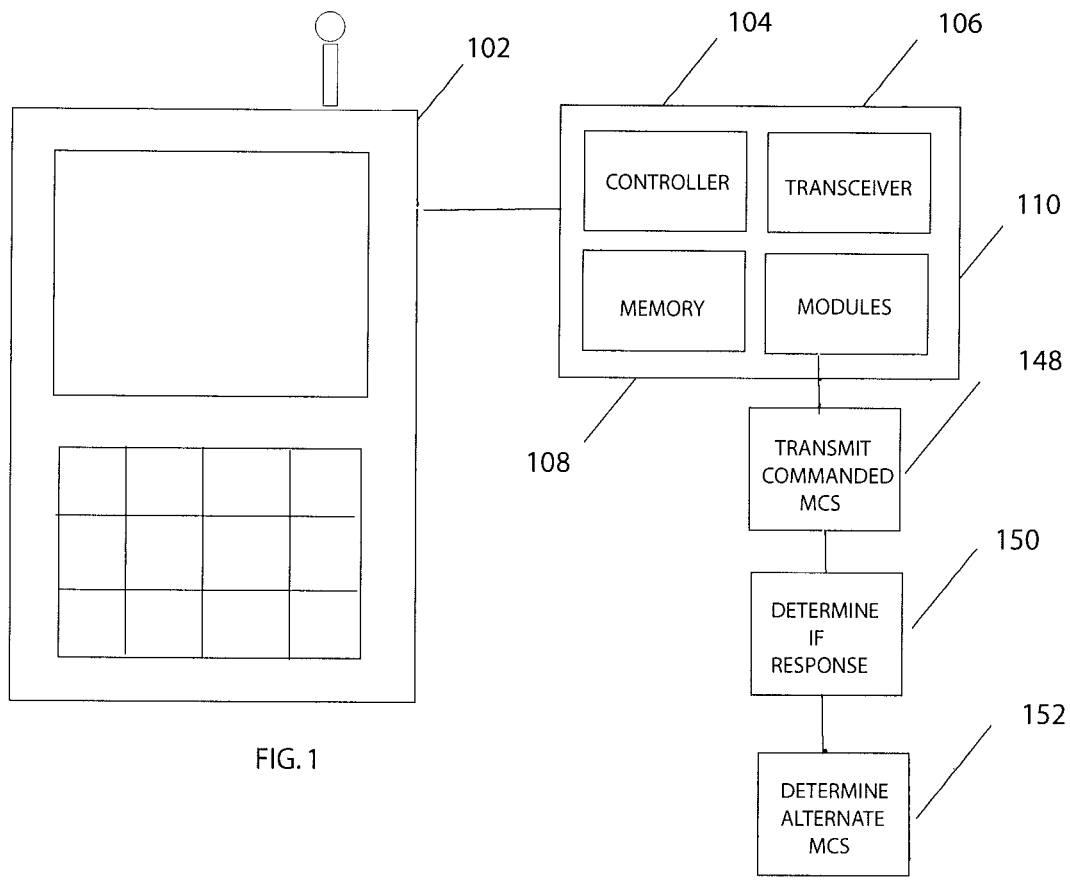
FIG. 1 depicts a mobile communication device including controller, a transceiver 106, a memory including instruction modules configured to preemptively change the MCS utilized to transmit an encoded data block.
FIG. 2 is a table including channel coding schemes, the data capacity for a time T, and the families correlated with the channel coding schemes.

Disclosed are mobile communication devices and methods of a mobile communication device that preemptively changes the MCS it uses to transmit data to a network to a more robust MCS. In a first embodiment, the device determines that no response has been received from a network, to a transmission of an encoded data block in accordance with a commanded MCS, within a predetermined period of time. The device then determines an alternative MCS having a robustness that is different from the commanded MCS' robustness and preemptively transmits the encoded data block in accordance with the alternative MCS. In this way the mobile communication device does not continue failed attempts to transmit data in accordance with the commanded MCS. Accordingly, there is less current drain on the device since sending the encoded data block in accordance with a more robust MCS is more likely to be received by the network. That is, in accordance with the disclosed methods and devices, fewer attempts at the transmission of the encoded data block may be made before a response to the transmission may be received by the device. Service availability is therefore less likely to be substantially slowed or interrupted. Since the device determines whether the communication between the device and the network are successful, the process is transparent to the user, who may not be aware of the brief service slowness.

Some 3GPP networks can transmit an Uplink Block Error Rate (UL BLER) value to the device. In another embodiment upon receipt of the UL BLER from the network, the device determines if it exceeds a predetermined threshold, and if so determines an alternative MCS having a robustness that is different from the commanded MCS' robustness and preemptively transmits the encoded data block in accordance with the alternative MCS. Similarly, in this embodiment the mobile communication device does not continue failed attempts to transmit data in accordance with the commanded MCS.

After the device receives notice of successful transmission of the encoded data block with the alternative MCS, the device will resume the use of the commanded MCS to transmit other encoded data blocks. In the event that the device does not receive a response or determines that the UL BLER exceeds a predetermined threshold, the device may transmit the encoded data block with another alternative MCS. After the device receives notice of successful transmission of the encoded data block with the other alternative MCS, the device will resume the use of the commanded MCS to transmit the next encoded data blocks. Since the failure to transmit in accordance with the commanded MCS is most likely temporary, resuming the use of the commanded MCS as soon as possible will make sure the optimal data throughput of the radio link is used.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to certain aspects relevant to the principles and concepts within the preferred embodiments.

FIG. 1 depicts a mobile communication device 102 including controller 104, a transceiver 106, a memory 108 including instruction modules 110 configured to preemptively change the MCS utilized to transmit an encoded data block. The depicted mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The controller 104 is coupled to the transceiver 106 which is configured to receive a transmission including a commanded modulation and coding scheme (MCS) having a particular robustness. The current standards for 3GPP include Channel Coding Schemes MCS-1 through MCS-9 as depicted in FIG. 2. Similar to the standards shown in FIG. 2 are new MCS standards called UAS and UBS. It is understood that the discussed methods and devices for preemptively transmitting a signal in accordance with a MCS other than a network commanded MCS are applicable to newer generations as standards continue to evolve. The controller 104 in conjunction with the transceiver 106 is configured to transmit a transmission of an encoded data block in response to a network commanded MCS in accordance with the "Transmit Commanded MCS" module 148. The controller 104 is further configured to determine when no response to the transmission of the encoded data block in accordance with the commanded MCS was received from the network within a predetermined period of time. The "Determine If Response" module 150 may include such instructions. The controller 104 is also configured to determine an alternative MCS, having a second robustness that is different or more robust than the particular robustness of the commanded MCS, after determining that no response to the transmission of the encoded data block in accordance with the commanded MCS was received from the network. The "Determine Alternative MCS" module 152 may include such instructions. The controller 104 and the transceiver 106 are further configured to preemptively transmit a transmission of the encoded data block in accordance with the alternative MCS. In this way, with a different or more robust signal it is likely that the network will receive the encoded data block.

The modules 148, 150, and 152 can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. It is understood that other modules or different modules may support the functions of the controller 104.

FIG. 2 is a table including channel coding schemes 220, the data capacity 222 for a time T, and the families 224 correlated with the channel coding schemes 220. As noted above, 8PSK includes MCS-5 through MCS-9. The data capacity 222 for an encoded data block increases in relation to the numerical increments of the channel coding schemes 220 increase. However, the robustness of the signal is, in a manner of speaking, inversely proportional to the increase in data throughput. Therefore, MCS-1 is more robust than MCS-9.

When a network (see FIG. 3 signal diagram including network) provides a packet uplink assignment signal to the mobile communication device 102 (see FIG. 1), the commanded MCS is provided as part of that signal. The commanded MCS belongs to a family 224. In one embodiment, when transmitting a transmission of the encoded data block in accordance with the alternative MCS, the alternative MCS may be in the same family 224 as the commanded MCS. For example, if the commanded MCS is MCS-7 which is in family B, the alternative MCS may be MCS-2 which is also in family B. It is understood that certain criteria may apply to the choice of the alternative MSC and such criteria are within the scope of this discussion.

FIG. 3 is a signal diagram depicting an embodiment of the disclosed methods. A mobile communication device 302 similar to that depicted in FIG. 1, for example, may roam out of optimal range of network station 330. The network station or server 330 is depicted as a remote server within a wireless communication network. The network station 330 of course may be any type of wireless network including an ad hoc or wireless personal area network, a WiFi or wireless local area network, and a cellular or wireless wide area network. Likewise, the network station 330 may be of any suitable configuration. The network station 330 may be implemented as a single server or as a plurality of servers in communication in any arrangement. The operations of the network station 330 may be distributed among different servers or devices that may communicate in any manner. It is understood that the depiction of a network 330 in FIG. 3 is for illustrative purposes.

The mobile communication device 302 as discussed above, may send a channel request 340 signal for a single block packet access to the network station 330, usually utilizing the GMSK modulation. The network station 330 may transmit an immediate assignment 342. The response of the mobile communication device 302 may be a packet resource request 344 that includes MCS capabilities, again normally utilizing GMSK and a robust coding scheme. The network 330 may transmit a packet uplink assignment 346 including a commanded MCS. The mobile communication device 302 may transmit an encoded data block in accordance with the commanded MCS 348. The Transmit Commanded MCS module 148 (see FIG. 1) can provide instructions to the controller 104 to transmit an encoded data block in accordance with the commanded MCS 348.

It is understood that the signal diagram of FIG. 3 represents an example of signal transfers. Moreover, as the standards evolve, the commanded and alternative coding of information schemes may be chosen in accordance with new standards. It is understood that any methods and devices to preemptively change or force any MCS used to transmit data by a mobile communication device that is different from a network commanded MCS is within the scope of this discussion. Future generations of communication standards may refer to a coding of information scheme in a different manner than an MCS, but it is understood that the same meaning shall be imparted to that technology.

The mobile communication device 302 may determine whether there is no satisfactory response, which may include that there is no response, in accordance with the Determine If Response module 150 (see FIG. 1). If there is no response 350 to a transmission 348 by the mobile communication device 302 utilizing the commanded MCS to the network 330 within a predetermined time, such as 1 second, or any suitable amount of time, the mobile communication device 302 may preemptively transmit the same data in an encoded data block in accordance with an MCS of a different robustness. This predetermined time may depend on the number of times the uplink data has already been sent. The signal that the mobile communication device 302 may normally receive in response to a successful transmission is a Packet Uplink Acknowledgement or Non-Acknowledgement (ACK/NACK) signal.

After the mobile communication device determines that no response 350 has been received from a network to a transmission of an encoded data block in accordance with a commanded MCS, within a predetermined period of time, the device then determines an alternative MCS having a robustness that is different from the commanded MCS' robustness and preemptively transmits the encoded data block in accordance with the alternative MCS 352. The mobile communication device 302 may determine the alternative MCS in accordance with the Determine Alternative MCS module (see FIG. 1). In one embodiment, the robustness of the alternative MCS is greater than the commanded MCS as discussed with reference to FIG. 2. Because it is likely that the network 330 will receive a signal of greater robustness where the signal of a lesser robustness failed, it is likely the mobile communication device 302 will not continue failed attempts to transmit data. Accordingly, current drain of the device may be reduced since sending the encoded data block in accordance with a more robust MCS is more likely to be received by the network. That is, in accordance with the disclosed methods and devices, fewer attempts at the transmission of the encoded data block may be made before a response to the transmission is be received by the device. Service availability is therefore less likely to be substantially slowed or interrupted. Since the device determines whether the communication between the device and the network is successful, the process is transparent to a user, and the user may not be aware of the disruption.

In the event that the network 330 receives the more robust signal, the mobile communication device 302 may receive a response such as an ACK/NACK response 354. The mobile communication device 302 may then resume the use of the commanded MCS to transmit subsequent encoded data blocks 356. In the event that the device does not receive a response 350 again, the device may transmit the encoded data block with the alternative MCS 352 or another alternative MCS. After the device receives notice of successful transmission of the encoded data block with the alternative MCS, the device 302 may again resume the use of the commanded MCS to transmit the next encoded data blocks. Since the failure to transmit in accordance with the commanded MCS is most likely temporary, resuming the use of the commanded MCS as soon as possible can provide the high data throughput benefit of initial commanded MCS.

FIG. 4 depicts a signal diagram of an embodiment of the disclosed methods involving a network 430 that can transmit an Uplink Block Error Rate (UL BLER) value to a mobile communication device 402. It is understood that an response including a UL BLER is not a satisfactory response. It is understood that any other type of non-satisfactory responses are within the scope of this discussion. Upon receipt of the UL BLER from the network 460 which is not a satisfactory response, the device then determines an alternative MCS having a robustness that is different from the commanded MCS' robustness and preemptively transmits the encoded data block in accordance with the alternative MCS 462. As in the embodiment described above, the mobile communication device 402 may not continue failed attempts to transmit data in accordance with the commanded MCS. After the mobile communication device 402 receives notice of successful transmission of the encoded data block with the alternative MCS 464, the device 402 will resume the use of the commanded MCS to transmit the next encoded data blocks 466.

Different processes are used to ensure that a network and a mobile communication device can decode an encoded data block. One such performance enhancing process is the use of redundancy and in particular punctured versions (also known as puncturing schemes). A same data block is retransmitted by the MS with a given MCS but with different punctured versions. The NW may combine received signals from these different punctured versions to enhance the decoding of the data block. This is known as Incremental Redundancy (IR). In one embodiment of the disclosed methods, transmitting a transmission of the encoded data block in accordance with the commanded MCS includes transmitting different punctured versions of the encoded data block prior to transmitting a transmission of the encoded data block in accordance with the alternative MCS. Also, the disclosed methods include transmitting the encoded data block in accordance with the alternative MCS includes transmitting different punctured versions of the encoded data block. It is understood that the disclosed methods and devices may include additional steps or alternative steps not necessarily discussed, but within the scope of the discussion.

Figure 5:
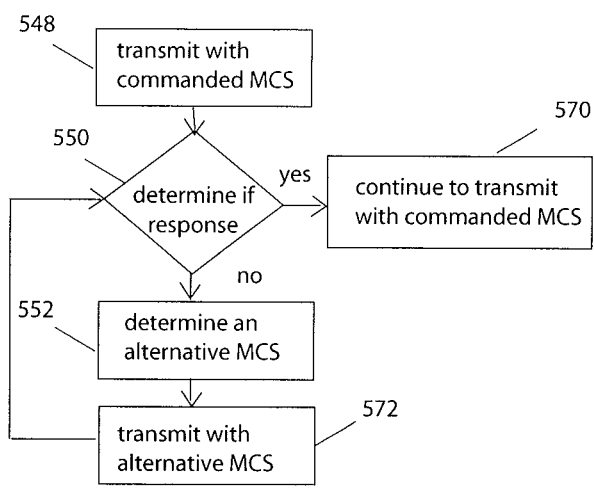
FIG. 5 is a flow chart depicting an embodiment of the disclosed methods where multiple attempts at transmission of an encoded data block may be made.

FIG. 5 is a flow chart depicting an embodiment of the disclosed methods where multiple attempts at transmission of an encoded data block may be made. Briefly referring to FIG. 2 including the families 224 of the channel coding scheme 220, if a commanded MCS is MCS-9 of family A in step 548, and no response 550 is received, an alternative MCS may be determined 552 that is a more robust, such as MCS-8 also of family A. As discussed above, if there is a response such as an ACK/NACK signal, then the transmissions may continue with the commanded MCS 570. The loop between steps 550 and 572 indicates that the process may be recursive. There may be more than two choices of an alternative MCS.

A transmission 572 with an alternate MCS, for example MCS-8 may be made, and again if no response is received 552, another alternative MSC may be determined that is more robust such as MCS-6 also of family A. If there is a response such as an ACK/NACK signal, then the transmissions 570 may continue with the commanded MCS. A transmission 572 with an alternate MCS, in this example MCS-6 may be made, and a determination 550 made and if no response is received 552, another alternative MSC may be determined 552 that is more robust such as MCS-3 also of family A. If there is a response such as an ACK/NACK signal, then the transmissions 570 may continue with the commanded MCS. In this example, the criteria for selecting an alternative MCS is that the MCS is in the same family as the commanded MCS. Accordingly, there may be many opportunities for the mobile communication device to force the transmission of the encoded data block depending upon the criteria for determining an alternative MCS when the commanded MCS fails.

In accordance with the disclosed methods and devices, since the device preemptively re-transmits an encoded data block if no response is received from a network in response to an original transmission of an encoded data block, fewer attempts at the transmission by the network of the encoded data block are made before a response to the transmission may be received by the device. Service availability is therefore less likely to be substantially slowed or interrupted. Since the device determines whether the communication between the device and the network is successful, the process may be transparent to a user, and the user may not be aware of the disruption.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of a mobile communication device for improving uplink transmission, comprising:
   receiving a transmission including a commanded modulation and coding scheme (MCS) having a first robustness;
   transmitting a transmission of an encoded data block in accordance with the commanded MCS;
   determining that no satisfactory response to the transmission of the encoded data block in accordance with the commanded MCS was received within a predetermined period of time;
   determining an alternative MCS having a second robustness different from the commanded MCS having the first robustness when determining that no response to the transmission of the encoded data block in accordance with the commanded MCS was received with the predetermined period of time, the commanded MCS and the alternative MCS are in a same MCS family; and
   preemptively transmitting from a mobile communication device a transmission of the encoded data block in accordance with the alternative MCS,
   determining that a response to the transmission of the encoded data block in accordance with the alternative MCS was received;
   transmitting a subsequent transmission of another encoded data block in accordance with the commanded MCS,
   wherein the second robustness of the alternative MCS is more robust than the first robustness of the commanded MCS, and
   wherein the commanded MCS includes at least one of Gaussian filtered Minimum Shift Keying (GMSK) as a modulation scheme and Eight Phase Shift Keying (8-PSK) as a modulation scheme, or both.

2. The method of claim 1 wherein determining that no satisfactory response to the transmission of the encoded data block in accordance with the commanded MCS was received comprises determining that no response has been received to the transmission of the encoded data block in accordance with the commanded MCS.

3. The method of claim 2 wherein determining that no response to the transmission of the encoded data block in accordance with the commanded MCS was received comprises:
   determining that no acknowledgement or negative acknowledgement for the encoded data block was received within the predetermined period of time.

4. The method of claim 1 wherein determining that no satisfactory response to the transmission of the encoded data block in accordance with the commanded MCS was received comprises:
   receiving a transmission from a network including a high uplink block error rate for the transmission of the encoded data block in accordance with the commanded MCS.

5. The method of claim 1, further comprising:
   determining that a response to the transmission of the encoded data block in accordance with the alternative MCS was not received; and
   transmitting a subsequent transmission of another encoded data block in accordance with the commanded MCS.

6. The method of claim 1, wherein transmitting a transmission of the encoded data block in accordance with the alternative MCS includes transmitting different punctured versions of the encoded data block.

7. The method of claim 1, further comprising:
   determining that no response to the transmission of the encoded data block in accordance with the alternative MCS was received;
   determining another alternative MCS having a third robustness that is different from the alternative MCS having second robustness when determining that no response to the transmission of the encoded data block in accordance with the alternative MCS was received; and
   transmitting a transmission of the encoded data block in accordance with the another alternative MCS.

8. The method of claim 3, further comprising:
   determining that no response to the transmission of the encoded data block in accordance with the alternative MCS was received within a predetermined period of time;
   determining another alternative MCS having a second robustness that is different from the commanded MCS having first robustness when determining that no response to the transmission of the encoded data block in accordance with the commanded MCS was received with the predetermined period of time; and
   transmitting a transmission of the encoded data block in accordance with the alternative MCS.

9. The method of claim 8, wherein determining that no response to the transmission of the encoded data block in accordance with the alternative MCS comprises:
   determining that no acknowledgement or negative acknowledgement for the encoded data block was received within the predetermined period of time.

10. A mobile communication device, the device, comprising:
    a transceiver configured to receive a transmission including a commanded modulation and coding scheme (MCS) having a first robustness and configured to transmit a transmission of an encoded data block in accordance with the commanded MCS; and
    a controller configured to determine when no response to the transmission of the encoded data block in accordance with the commanded MCS was received within a predetermined period of time and configured to determine an alternative MCS having a second robustness that is different from the commanded MCS having first robustness when determining that no response to the transmission of the encoded data block in accordance with the commanded MCS was received, wherein the transceiver is further configured to preemptively transmit a transmission of the encoded data block in accordance with the alternative MCS, the controller is further configured to determine that a response to the transmission of the encoded data block in accordance with the alternative MCS was received;

the transmitter is further configured to transmit a subsequent transmission of another encoded data block in accordance with the commanded MCS, and the second robustness of the alternative MCS is more robust than the first robustness of the commanded MCS, the commanded MCS and the alternative MCS are in a same MCS family.

11. The device of claim 10 wherein the commanded MCS includes at least one of Gaussian filtered Minimum Shift Keying (GMSK) as a modulation scheme and Eight Phase Shift Keying (8-PSK) as a modulation scheme, or both.

* * * * *